(12) United States Patent
Antrim et al.

(10) Patent No.: US 12,002,296 B2
(45) Date of Patent: *Jun. 4, 2024

(54) IDENTIFICATION VERIFICATION SYSTEM AND RELATED METHODS

(71) Applicant: CHECKPOINT ID, INC., Goodyear, AZ (US)

(72) Inventors: Ryan Antrim, Scottsdale, AZ (US); Andrey Stanovnov, Kenner, LA (US)

(73) Assignee: CHECKPOINT ID, INC., Goodyear, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/083,667

(22) Filed: Dec. 19, 2022

(65) Prior Publication Data
US 2023/0122771 A1 Apr. 20, 2023

Related U.S. Application Data

(63) Continuation of application No. 16/905,344, filed on Jun. 18, 2020, now Pat. No. 11,532,183.
(Continued)

(51) Int. Cl.
*G06V 40/70* (2022.01)
*G06F 16/54* (2019.01)
(Continued)

(52) U.S. Cl.
CPC .............. *G06V 40/70* (2022.01); *G06F 16/54* (2019.01); *G06F 21/6245* (2013.01);
(Continued)

(58) Field of Classification Search
CPC ...... G06V 40/70; G06V 40/172; G06V 40/50; G06V 40/67; G06F 16/54; G06F 21/6245; G06K 19/06037; G06N 20/00
See application file for complete search history.

(56) References Cited

U.S. PATENT DOCUMENTS

| | | |
|---|---|---|
| 8,832,805 B1 | 9/2014 | McGilliard |
| 9,396,383 B2 | 7/2016 | King |

(Continued)

FOREIGN PATENT DOCUMENTS

| | | |
|---|---|---|
| AU | 2014275340 A1 | 12/2015 |
| CA | 3046924 A1 | 5/2018 |

(Continued)

OTHER PUBLICATIONS

Onfido, A Guide to Digital Identity Verification: The Technology and Trends, Retrieved from Internet: < htlps://cdn2.hubspot.nel/hubfs/2109161/Final%20-%20Onfido%20Tech%20White%20Paper%20Oct%2018.pdf> [retrieved Oct. 30, 2019], Version 1.0, 38 pages.

(Continued)

*Primary Examiner* — Nizar N Sivji
(74) *Attorney, Agent, or Firm* — Calfee, Halter & Griswold LLP

(57) ABSTRACT

Another aspect of the present disclosure relates to a method for identification verification. The method may include receiving, from a computing device, a request for identification verification of an individual at a web server. The web server may include an orientation verification module and a facial recognition module. The method may include receiving at a database an identification card image and a picture image. The method may include verifying an orientation of the identification card image is oriented relative to an accepted orientation using the orientation verification module. The method may include, if the identification card image is not oriented relative to the accepted orientation, using the web server, iteratively rotating the identification card image in one or more increments and assessing if the identification card image is oriented at the accepted orientation until the identification card image is oriented at the accepted orientation.

9 Claims, 11 Drawing Sheets

Related U.S. Application Data

(60) Provisional application No. 62/863,409, filed on Jun. 19, 2019.

(51) Int. Cl.
　　*G06F 21/62*　　(2013.01)
　　*G06K 19/06*　　(2006.01)
　　*G06N 20/00*　　(2019.01)
　　*G06V 40/16*　　(2022.01)
　　*G06V 40/50*　　(2022.01)
　　*G06V 40/60*　　(2022.01)

(52) U.S. Cl.
　　CPC ....... *G06K 19/06037* (2013.01); *G06N 20/00* (2019.01); *G06V 40/172* (2022.01); *G06V 40/50* (2022.01); *G06V 40/67* (2022.01)

(56) References Cited

U.S. PATENT DOCUMENTS

| | | | | |
|---|---|---|---|---|
| 9,481,197 | B2* | 11/2016 | Eckel | G06F 21/32 |
| 9,785,764 | B2 | 10/2017 | Loughlin-McHugh et al. | |
| 10,242,283 | B1* | 3/2019 | Jain | G06V 10/255 |
| 10,452,897 | B1* | 10/2019 | Benkreira | G06V 20/62 |
| 10,475,038 | B1* | 11/2019 | Osborn | G06Q 20/042 |
| 2012/0114189 | A1* | 5/2012 | Lee | G06F 21/32 |
| | | | | 382/115 |
| 2013/0036458 | A1 | 2/2013 | Liberman et al. | |
| 2018/0005021 | A1* | 1/2018 | Young | G06V 40/165 |
| 2018/0068173 | A1* | 3/2018 | Kolleri | G06Q 10/10 |
| 2018/0189583 | A1* | 7/2018 | Wohlken | H04W 12/06 |
| 2018/0260617 | A1* | 9/2018 | Jones | G06K 7/1417 |
| 2020/0043319 | A1* | 2/2020 | Nigam | G06F 16/5838 |

FOREIGN PATENT DOCUMENTS

| | | |
|---|---|---|
| CA | 3084855 A1 | 1/2021 |
| WO | 2014155130 A2 | 10/2014 |
| WO | 2016131083 A1 | 8/2016 |

OTHER PUBLICATIONS

BioID, Identity Proofing with BioID PhotoVerify: Know Your Customer with Confidence, Retrieved from Internet: <https://www.bioid.com/identity-proofing-photoverify/> [retrieved Oct. 30, 2019], 6 pages.

Onespan, Biometric Identity Verification: The Difference Between Facial Recognition and Facial Comparison Technology, Retrieved from Internet: <htlps://www.onespan.com/blog/biometric-identity-verification-difference-between-facial-recognition-and-facial-comparison> [retrieved Oct. 30, 2019], Jun. 6, 2019, 3 pages.

Shuftipro, Document Verification: Verify IDs Anywhere, Anytime, Retrieved from Internet: <https://shuftipro.com/document-verification/> [retrieved Oct. 30, 2019], 6 pages.

Bluecheck, Automated Photo ID Verification, Retrieved from Internet: <htlps://www.bluecheck.me/technologies/automated-photo-id-verification> [retrieved Oct. 30, 2019], 6 pages.

Mitek, Mobile Verify, Retrieved from Internet: <https://www.miteksystems.com/mobile-verify> [retrieved Oct. 30, J019], 17 pages.

Acuant, Trusted Identity Platform, Retrieved from Internet: <https://www.acuantcorp.com/> [retrieved Oct. 30, 2019], 8 pages.

Jumio, Jumio Authentication, Retrieved from Internet: <https://www.jumio.com/authentication/ [retrieved Oct. 30, 2019], 6 pages.

Innovatrics, Dot—Digital Onboarding Toolkit, Retrieved from Internet: <https://www.innovatrics.com/digital-onboarding-toolkit/> [retrieved Oct. 30, 2019], 6 pages.

Biometric ID cards at CTU in Prague (Year: 2012).

Border Crossing Security and Privacy in Biometric Passport using Cryptographic Authentication Protocl (Year: 2013).

Service Authentication via electronic identification cards (Year: 2012).

* cited by examiner

| Barcode | Facial ID | Expiration | First Name | Middle Name | Last Name |
|---|---|---|---|---|---|
| | ⊙ PASS | | | | |
| ⊙ PASS | ⊙ PASS | ⊙ VALID | Address | City | Postal Code |
| | | | State | Expiration | Birthdate |

⊗ FAILED

Unable to verify this ID online.
Please request applicant to bring in supporting documents.

| Barcode | Facial ID | Expiration | First Name | Middle Name | Last Name |
|---|---|---|---|---|---|
| | ⊗ FAIL | | | | |
| ⊙ PASS | | ⊙ VALID | Address | City | Postal Code |
| | | | State | Expiration | Birthdate |

Possible reasons for a failed Facial Verification result:

| Image resolution | Old image | Position | Lighting |
|---|---|---|---|
| The uploaded image is too blurry to verify. | The uploaded image is not up-to-date. | Image was taken at an angle or distance. | Dark lighting can obscure facial features. |

FIG. 13

IDENTIFICATION VERIFICATION SYSTEM AND RELATED METHODS

CROSS REFERENCE TO RELATED APPLICATIONS

The present application is a continuation application of U.S. patent application Ser. No. 16/905,344 filed on Jun. 18, 2020, which claims priority to U.S. Provisional Patent Application No. 62/863,409 filed on Jun. 19, 2019. The entirety of each application is incorporated herein by reference for all purposes.

TECHNICAL FIELD

Aspects of this document relate generally to systems and methods, such as systems and methods for identification verification. More specific implementations involve web based identification verification systems.

BACKGROUND

Generally, identification verification systems are used to verify the identification of an individual. An official issued form of identification may be used to verify an individual's identity. Official forms of identification may include a driver's license or a passport.

SUMMARY

One aspect of the present disclosure relates to a system configured for identification verification. The system may include one or more processors including a file format module, a format validation module, a pattern validation module, an orientation verification module, and a facial recognition module. The one or more processors may be configured by machine-readable instructions to receive, from a computing device, a request for identification verification of an individual. The processor(s) may be configured to receive at a database, from the computing device, an image file corresponding with an identification card (identification card image) for the individual. The processor(s) may be configured to either encrypt, redact, or purge one or more pieces of identifying information of the individual included in the identification card image received at the database. The processor(s) may be configured to receive, at the database, from the computing device, an image corresponding to a picture (picture image) of an individual. The processor(s) may be configured to, in response to receiving the request for identification verification, verify that the identification card image for the individual and the picture image each meet a predetermined quality threshold. The processor(s) may be configured to, in response to receiving the request from the computing device, verify that the identification card image and the picture image are each of an accepted file type. The processor(s) may be configured to, if the identification card image and the picture image are not of an accepted file type, transmit, through a telecommunication channel, from the web server, to the computing device, a first error message. The processor(s) may be configured to, if one of the identification card image or the picture image do not meet the predetermined quality threshold, transmit, through the telecommunication channel, from the web server to the computing device, a second error message. The processor(s) may be configured to verify an orientation of the identification card image is oriented relative to an accepted orientation using the orientation verification module. The processor(s) may be configured to, if the identification card image is not oriented relative to the accepted orientation, iteratively rotate the identification card image in one or more increments and assess if the identification card image is oriented at the accepted orientation until the identification card image is oriented at the accepted orientation. The processor(s) may be configured to determine that the identification card image is a particular form of identification using the format validation module. The processor(s) may be configured to, if the identification card image does not represent a valid form of identification, transmit, through the telecommunication channel to the computing device, a third error message. The processor(s) may be configured to identify one or more elements of the identification card image which correspond to one or more predetermined elements of corresponding identification cards using the pattern validation module. The processor(s) may be configured to, if the one or more elements of the identification card image corresponding to the one or more predetermined elements of corresponding identification cards cannot be identified, transmit, through the telecommunication channel to the computing device, a fourth error message. The processor(s) may be configured to compare a first likeness of the individual from the identification card image with a second likeness of the individual from the picture using the facial recognition module. The processor(s) may be configured to, if the first likeness of the individual matches the second likeness of the individual within a predetermined confidence range, transmit, through the telecommunication channel to the computing device, an indication of validation. The processor(s) may be configured to, if the first likeness of the individual does not match the second likeness of the individual within the predetermined confidence range, transmit, through the telecommunication channel, from the web server to the computing device, a fifth error message. The processor(s) may be configured to delete the identification card image and the picture image from the database.

In some implementations of the system, the one or more pieces of identifying information may include gender information, date of birth information, and either a drivers license number or passport number.

In some implementations of the system, the processor(s) may be configured to use optical character recognition to determine that the identification card image is oriented relative to the accepted orientation.

In some implementations of the system, the processor(s) may be configured to use facial recognition to determine that the identification card image is oriented relative to the accepted orientation.

In some implementations of the system, the processor(s) may be configured to use both optical character recognition and facial recognition technology to determine that the identification card is oriented relative to the accepted orientation.

In some implementations of the system, the identification card image may be iteratively rotated in 90 degree increments.

In some implementations of the system, the identification card image may be iteratively rotated in 45 degree increments.

In some implementations of the system, the identification card image may be iteratively rotated in less than 45 degree increments.

In some implementations of the system, the processor(s) may be configured to recognize text of the identification card image, using optical character recognition, using a web server.

In some implementations of the system, the verifying that the identification card image may represent the valid form of identification further includes decoding a barcode on the identification card image.

In some implementations of the system, all identifying information except the first likeness and name of the individual may be either encrypted, redacted, or purged from the database after the identification card image is received at the database.

Another aspect of the present disclosure relates to a method for identification verification. The method may include receiving, from a computing device, a request for identification verification of an individual at a web server. The web server may include a file format module, a format validation module, a pattern validation module, an orientation verification module, and a facial recognition module. The method may include receiving, at a database electronically coupled with the web server, from the computing device, an image file corresponding with an identification card for the individual. The method may include using the web server, one of encrypting or purging one or more pieces of identifying information of the individual included in the identification card image received at the database. The method may include receiving, at the database, from the computing device, an image corresponding to a picture of an individual wherein the database receives the picture image separately from the identification card image. The method may include, in response to receiving the request for identification verification, verifying, using the web server, that the identification card image for the individual and the picture image each meet a predetermined quality threshold. The method may include, in response to receiving the request from the computing device, verifying that the identification card image and the picture image are each of an accepted file type. The method may include, if the identification card image and the picture image are not of an accepted file type, transmitting, through a telecommunication channel, from the web server, to the computing device, a first error message. The method may include, if one of the identification card image or the picture image do not meet the predetermined quality threshold, transmitting, through the telecommunication channel, from the web server to the computing device, a second error message. The method may include verifying an orientation of a identification card image is oriented relative to an accepted orientation using the orientation verification module. The method may include, if the identification card image is not oriented relative to the accepted orientation, using the web server, iteratively rotating the identification card image in one or more increments and assessing if the identification card image is oriented at the accepted orientation until the identification card image is oriented at the accepted orientation. The method may include determining that the identification card image is a particular form of identification using the format validation module. The method may include, if the identification card image does not represent a valid form of identification, transmitting, through the telecommunication channel, from the web server to the computing device, a third error message. The method may include identifying one or more elements of the identification card image which correspond to one or more predetermined elements of corresponding identification cards using the pattern validation module. The method may include, if the one or more elements of the identification card image corresponding to the one or more predetermined elements of corresponding identification cards, cannot be identified, transmitting, through the telecommunication channel, from the web server to the computing device, a fourth error message. The method may include comparing a first likeness of the individual from the identification card image with a second likeness of the individual from the picture using the facial recognition module. The method may include, if the first likeness of the individual matches the second likeness of the individual within a predetermined confidence range, transmitting, through the telecommunication channel, from the web server to the computing device, an indication of validation. The method may include, if the first likeness of the individual does not match the second likeness of the individual within the predetermined confidence range, transmitting, through the telecommunication channel, from the web server to the computing device, a fifth error message. The method may include deleting the identification card image and the picture image from the database.

In some implementations of the method, one or more of the first error message, the second error message, the third error message, the fourth error message, and the fifth error message are transmitted, through a second telecommunication channel, to an administrator of the web server from the web server.

In some implementations of the method, the fifth error message may be sent if the first likeness of the individual matches the second likeness of the individual too closely.

In some implementations of the method, if one of the first error message, the second error message, the third error message, the fourth error message, or the fifth error message is transmitted to the computing device, the method may also include transmitting, through the wireless telecommunication channel, instructions to have a user provide additional documentation to a manager of the web server.

In some implementations the method may include transmitting through a third telecommunication channel, a request to a third party, from the web server, to run a criminal background check on the individual.

In some implementations of the method, the identification card image may be iteratively rotated in 45 degree increments.

In some implementations of the method, the web server may utilize a machine learning algorithm to verify that the identification card image for the individual and the picture image meet the predetermined quality threshold.

In some implementations of the method, all identifying information except the first likeness and name of the individual may be either encrypted, redacted, or purged from the database after the identification card image is received at the database.

In some implementations the method may be compliant with fair housing regulations.

Another aspect of the present disclosure relates to a method for identification verification. The method may include receiving, from a computing device, a request for identification verification of an individual at a web server. The web server may include a pattern validation module, an orientation verification module, and a facial recognition module. The method may include receiving, at a database electronically coupled with the web server, from the computing device, an identification card image for the individual. The method may include using the web server, one of encrypting or purging one or more pieces of identifying information of the individual included in the identification card image received at the database. The method may include receiving, at the database, from the computing device, a picture image. The method may include verifying an orientation of the identification card image is oriented relative to an accepted orientation using the orientation verification module. The method may include, if the identification card image is not oriented relative to the accepted orientation, using the web server, iteratively rotating the identification card image in one or more increments and assessing if the identification card image is oriented at the accepted orientation until the identification card image is oriented at the accepted orientation. The method may include identifying one or more elements of the identification card image which correspond to one or more predetermined elements of corresponding identification cards using the pattern validation module. The method may include, if the one or more elements of the identification card image corresponding to the one or more predetermined elements of corresponding identification cards, cannot be identified, transmitting, through the telecommunication channel, from the web server to the computing device, an error message. The method may include comparing a first likeness of the individual from the identification card image with a second likeness of the individual from the picture using the facial recognition module.

In some implementations the method may include using both optical character recognition and facial recognition technology to determine that the identification card is oriented relative to the accepted orientation.

In some implementations of the method the identification card image is iteratively rotated in 90 degree increments.

In some implementations of the method the identification card image may be either an image of a driver's license or an image of a passport.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 13 illustrates a GUI of a computing device operated by a manager of the system.

DETAILED DESCRIPTION

This disclosure, its aspects and implementations, are not limited to the specific components, assembly procedures or method elements disclosed herein. Many additional components, assembly procedures and/or method elements known in the art consistent with the intended identification verification system will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for identification verification, and implementing components and methods, consistent with the intended operation and methods.

Figure 1:
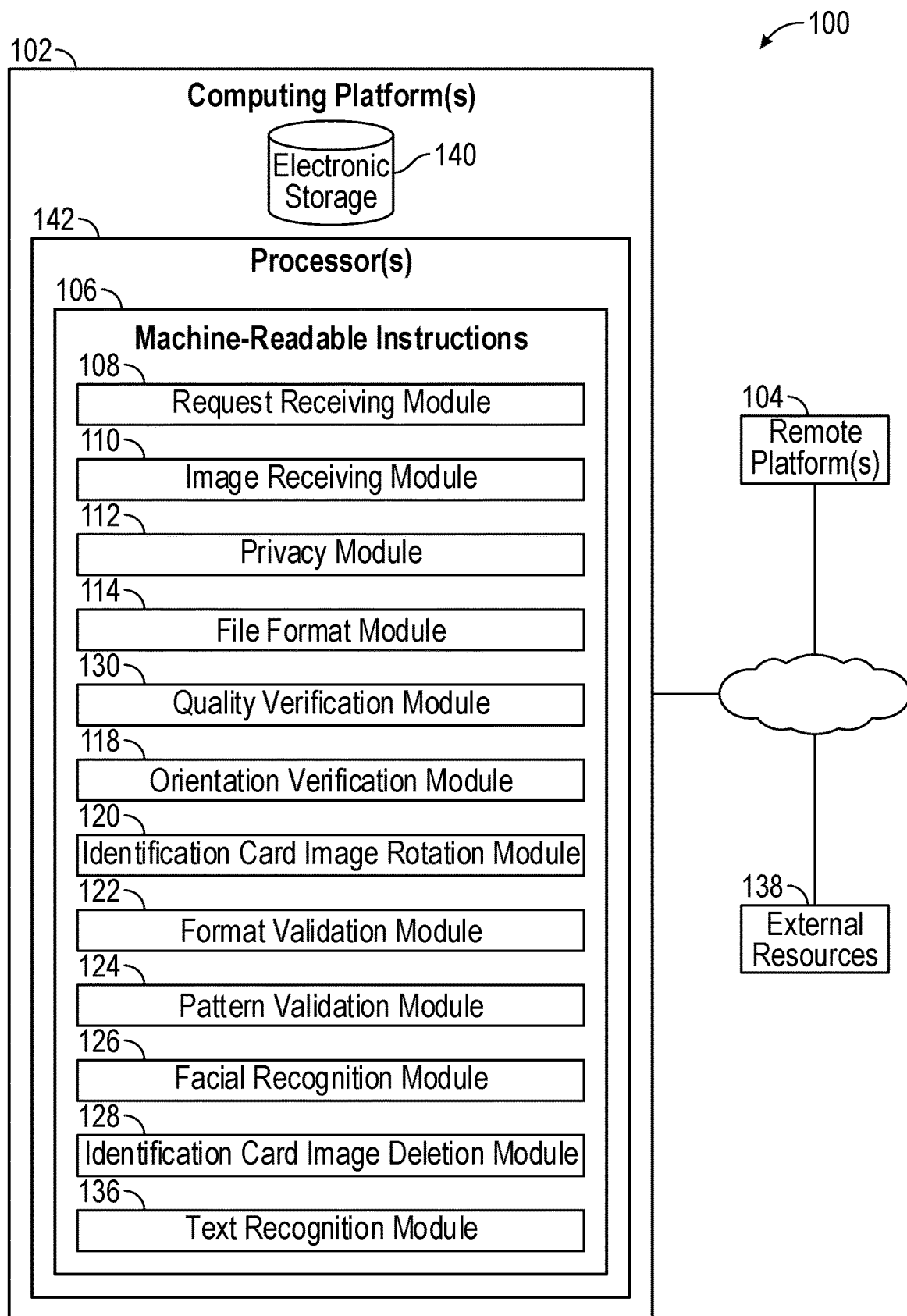
FIG. 1 illustrates a schematic of an implementation of an identification verification system.

FIG. 1 illustrates a system 100 configured for identification verification, in accordance with one or more implementations. In various implementations, the system may be a web-based system configured to run on the web rather than in a mobile application. In various implementations, and as illustrated by FIG. 1, the system may include one or more computing platforms 102 operatively coupled to one or more remote platforms 104. The computing platform(s) 102 may also be operatively coupled to additional external resources 138. Computing platform(s) 102 may be configured to communicate with one or more remote platforms 104 according to a client/server architecture, a peer-to-peer architecture, and/or other architectures. Users may access system 100 via remote platform(s) 104. In various implementations, the remote platform 104 may be a computing device. In such implementations, the remote platform 104 may include one or more processors 142 (which may be hardware processors) configured to execute computer program modules. The computer program modules may be configured to enable an expert or user associated with the given remote platform 104 to interface with system 100 and/or external resources 138, and/or provide other functionality attributed herein to remote platform(s) 104. Remote platform(s) 104 may be configured to communicate with other remote platforms via computing platform(s) 102 and/or according to a client/server architecture, a peer-to-peer architecture, and/or other architectures. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms. In particular implementations, computing platform(s) 102 may include a web server. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Computing platform(s) 102 may include electronic storage 140, one or more processors 142, and/or other components. Computing platform(s) 102 may include communication lines, or ports to enable the exchange of information with a network and/or other computing platforms. Illustration of computing platform(s) 102 in FIG. 1 is not intended to be limiting.

In various implementations, the electronic storage 140 may include a database. Electronic storage 140 may comprise non-transitory storage media that electronically stores information. The electronic storage media of electronic storage 140 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 140 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 140 may include one or more virtual storage resources (e.g., cloud storage, a virtual private network, and/or other virtual storage resources). Electronic storage 140 may store software algorithms, information determined by processor(s) 142, information received from computing platform(s) 102, information received from remote platform(s) 104, and/or other information that enables computing platform(s) 102 to function as described herein.

Processor(s) 142 may be configured to provide information processing capabilities in computing platform(s) 102. As such, processor(s) 142 may include one or more of a digital processor, an analog processor, a digital circuit designed to process information, an analog circuit designed to process information, a state machine, and/or other mechanisms for electronically processing information. Although processor(s) 142 is shown in FIG. 1 as a single entity, this is for illustrative purposes only. In some implementations, processor(s) 142 may include a plurality of processing units. These processing units may be physically located within the same device, or processor(s) 142 may represent processing functionality of a plurality of devices operating in coordination. Processor(s) 142 may be configured to execute modules (including any modules disclosed herein, including modules 108, 110, 112, 114, 116, 118, 120, 122, 124, 126, 128, 130, and/or 136, and/or other modules). Processor(s) 142 may be configured to execute any such modules by software; hardware; firmware; some combination of software, hardware, and/or firmware; and/or other mechanisms for configuring processing capabilities on processor(s) 142. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules illustrated by FIG. 1 are illustrated as being implemented within a single processing unit, in implementations in which processor(s) 142 includes multiple processing units, one or more of modules 108, 110, 112, 114, 116, 118, 120, 122, 124, 126, 128, 130 and/or 136 may be implemented remotely from the other modules.

Computing platform(s) 102 may be configured by machine-readable instructions 106. Machine-readable instructions 106 may include one or more instruction modules. Likewise, in implementations where the computing platform(s) 102 include a web server, the web server may also include the one or more instruction modules. The instruction modules may include computer program modules. The instruction modules may include one or more of request receiving module 108, image receiving module 110, privacy module 112, file format module 114, quality verification module 130, orientation verification module 118, identification card image rotation module 120, format validation module 122, pattern validation module 124, facial recognition module 126, image deletion module 128, a quality verification module 130, a text recognition module 136, and/or other instruction modules.

Request receiving module 108 may be configured to receive, from a computing device, a request for identification verification of an individual. In various implementations, the request may be sent by an individual looking to rent a property and needing to have their identification verified. In the implementations disclosed herein, the identity of the individual may be verified remotely and through a web-based application. Accordingly, the implementations disclosed herein do not require the individual to download a particular mobile application for verifying their identity.

Image receiving module 110 may be configured to receive, at the electronic storage 140 of the computing platform(s) 102, from the remote platform 104, an image file corresponding with an identification card (hereinafter referred to "identification card image") for the individual. In particular implementations, the image receiving module 110 may receive the identification card image at a database included in the electronic storage. The database may be coupled with a web server that is part of the computing platform(s) 102. In various implementations, the identification card image may include an image of the individual's driver's license, passport, or any other document providing identification of an individual. The identification card image may be captured by a camera of the remote platform 104. In other implementations the identification card image may be captured by another camera or scanner and transmitted to the remote platform 104 to then be transmitted to the image receiving module 110. In various implementations, an image of the front and back of the identification card image may be included in the identification card image received by the image receiving module. In other implementations (including implementations where the identification card image is an image of a passport), the identification card image may include only an image of the front of the document providing identification of the individual.

Image receiving module 110 may be configured to receive, at the electronic storage 140 or at a database within the electronic storage, from the remote platform(s) 104, an image corresponding to a picture (hereinafter referred to as "picture image") of an individual. In various implementations, the picture image may be configured to be captured using a camera included in the computing device of the remote platform 104. In particular implementations, the individual may take a picture of themselves with a mobile phone and send that photo to the image receiving module 110. In various implementations, the image receiving module may be configured to receive the picture image in a separate image file from the identification card image.

In various implementations privacy module 112 may be configured to either encrypt, redact, or purge one or more pieces of identifying information of the individual included in the identification card image received at the database. By way of non-limiting example, the one or more pieces of identifying information may include gender information, date of birth information, a drivers license number, a passport number, or any other piece of identifying information aside from the picture of the individual on the identification card image and the name of the individual on the identification card image. In such implementations, the identification verification system may be compliant with the Fair Housing Regulations in place at the time of filing this application.

In implementations including file format module 114, the file format module may be configured to, in response to receiving the request for identification verification, verify that the identification card image for the individual and the picture image are each of a particular file type. The file type may be a JPEG, PDF, or any other predetermined file type. In such implementations, if one or more of the identification card image or picture image are not of an accepted file type, the file format module may transmit an error message, through a telecommunication channel, to the remote platform 104, with an instruction to correct the uploaded images and/or to initiate another upload of the images.

In implementations including a quality verification module 130, the quality verification module may be configured to determine of the identification card image and/or the picture image meet a predetermined quality threshold. By way of non-limiting example, the predetermined quality threshold may include a sharpness threshold, a color threshold, and/or a sizing threshold. In various implementations, the threshold may be predetermined and input into the quality verification module by a manager of the system. In various implementations, the quality verification module may be configured to verify that the uploaded documents are not, by non-limiting example, blurry, cropped, in black and white, a photo having multiple people, a photo that is too old, a photo too distant, or otherwise defective. In various implementations, the quality verification module may be instructed, using a machine learning algorithm, to identify defective or unacceptable documents, pictures, or copies. In such implementations, the quality verification module may transmit an error message to the remote platform 104 indicating that the quality threshold was not met. In such implementations, the error message may include additional information as to why the error was issues and/or how to correct the error. As an example, the error message may state "photo is blurry."

In various implementations the computing platform may include a text recognition module 136 which may be configured to recognize text of the identification card image. The text may be identified using optical character recognition.

In various implementations, orientation verification module 118 may be configured to verify that an orientation of the identification card image is oriented relative to an accepted orientation using the orientation verification module. The accepted orientation may be a predetermined range of orientations input into the orientation verification module 118 by a manager of the system. In such implementations, the accepted orientation may include a range of orientations spanning a difference of 20 degrees, more than 20 degrees, or less than 20 degrees. In various implementations, the accepted orientation of the identification card image may correspond to an orientation of the picture image.

In various implementations, if the orientation verification module detects that the identification card image does not correspond to the accepted orientation, the identification card image rotation module 120 may be configured to iteratively rotate the identification card image in one or more increments. In various implementations, the identifications card image rotation module 120 may rotate the identification card image in increments of 90 degrees, 45 degrees, 5 degrees, less than five degrees, or any other number of degrees. In various implementations, upon rotation of the identification card image by a single increment, the orientation verification module 118 may again verify if the orientation of the identification card image is oriented at the accepted orientation. If not, the identification card image rotation module may rotate the identification card image another increment. The orientation verification module may then again verify if the orientation of the identification card image corresponds to the accepted orientation. The identification card image rotation module may continue rotating the identification card image until the orientation verification module determines that the identification card image corresponds to the accepted orientation.

In still other implementations, a machine learning algorithm may be used to instruct the orientation verification module to recognize when the identification card image is corresponds to the accepted orientation. In such implementations, the machine learning algorithm may instruct the identification card image rotation module to rotate the identification card image to the accepted orientation in a single rotational movement rather than having to iteratively rotate the identification card image. In such implementations, this may be done by feeding the computing platform 102 a number of pictures and indicating proper versus incorrect orientations.

In other implementations, rather than the orientation verification module verifying the orientation of the identification card image and the identification card image rotation module rotating the identification card image, the orientation verification module may verify the orientation of the picture image and the picture image may be iteratively rotated until it is in the same orientation as the identification card image. In still other implementations, both the orientation of the identification card image and the picture image may be verified and rotated to the acceptable orientation.

In various implementations, the orientation verification module may use optical character recognition (OCR) to determine that the identification card image is oriented relative to the accepted orientation. In other implementations, the orientation verification module may use facial recognition to determine when the identification card image is oriented relative to the accepted orientation. In still other implementations, the orientation verification module may use both OCR and facial recognition to determine that the identification card image is oriented relative to the accepted orientation.

In implementations including a format validation module, the format validation module 122 may be configured to determine that the identification card image corresponds with a particular form of identification. In particular implementations, the format validation module 122 may be configured to recognize a driver's license, a passport, or another document used to verify identification. In particular implementations, the format validation module may determine that an identification card image represents a valid form of identification by decoding a bar code or other printed code in the identification card image.

In various implementations, if the format validation module determines that the identification card image does not represent a valid form of identification, the format validation module may transmit through a telecommunication channel to the remote platform 104 an error message which may indicate that the identification card image does not represent a valid form of identification. In other implementations, a different element of the computing platform 102 aside from the format validation module may transmit the error message to the remote platform 104.

In implementations including a pattern validation module 124, the pattern validation module may be configured to identify one or more elements of the identification card image which correspond to one or more predetermined elements of corresponding identification cards. In such implementations, particular authenticity elements of various forms of identification may be stored in a database and/or the electronic storage 140. For example, driver's licenses from various states may all include particular authenticity elements, such as a location of an icon or a particular number/letter in a particular location. These elements may be stored in the database and/or electronic storage 140. In implementations including the pattern validation module 124, the pattern validation module may be configured to identify one or more of the authenticity elements of the particular identification card image.

In various implementations, if the pattern validation module determines that the identification card image does not include the necessary amount of authenticity elements and the identification card image does not represent a valid form of identification, the pattern validation module may transmit through a telecommunication channel to the remote platform 104 an error message which may indicate that the identification card image does not represent a valid form of identification. In other implementations, a different element of the computing platform 102 aside from the pattern validation module may transmit the error message to the remote platform 104.

In various implementations the pattern validation module may be configured to make a determination within a predetermined confidence level. In such implementations, the predetermined confidence level may be set by a manager of the system.

In various implementations, the facial recognition module 126 may be configured to compare a first likeness of the individual from the identification card image with a second likeness of the individual from the picture image. In various implementations, if the first likeness of the individual matches the second likeness of the individual within a predetermined confidence range, the facial recognition module may transmit through the telecommunication channel to the remote platform 104, an indication of validation. The predetermined confidence range may be set by a manager of a system.

In various implementations, the facial recognition module 126 may be configured to, if the first likeness of the individual does not match the second likeness of the individual within the predetermined confidence range, transmit, through the telecommunication channel, to the remote platform 104, an error message. In various implementations, the error message may be sent if either the first likeness of the individual does not match the second likeness of the individual closely enough or if the first likeness of the individual matches the second likeness of the individual too closely. In such implementations, this may ensure that the likenesses are of the same individual but that the images include different likenesses to prevent an individual from uploading the identification card image in place of the picture image. In other implementations, a different element of the computing platform 102 aside from the facial recognition module may transmit the error message to the remote platform 104.

In any of the implementations where an error message is transmitted to the remote platform 104, in various implementations an additional error message may also be sent to a manager or administrator of the system. In other implementations, the error message may be sent to the manager or administrator of the system rather than to the remote platform 104 used or operated by the individual whose identity is being verified. In implementations where an error message is sent to the remote platform 104, the error message may also include instructions on how to correct the error for the individual verifying their identity. Such instructions may include "photo is too blurry" or "upload appropriate file type."

In implementations having an image deletion module 128, the image deletion module may be configured to delete the identification card image and/or the picture image from the database or electronic storage.

In various implementations, the computing platform may be configured to transmit a request to a third party, through a telecommunication channel, to run a criminal background check on the individual.

In some implementations, computing platform(s) 102, remote platform(s) 104, and/or external resources 138 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 138 may be operatively linked via some other communication media.

External resources 138 may include sources of information outside of system 100, external entities participating with system 100, and/or other resources. In some implementations, some or all of the functionality attributed herein to external resources 138 may be provided by resources included in system 100.

In any of the implementations where a particular module is disclosed as configured to perform a particular function, in other implementations it is understood that a web server could be configured to perform that same function.

In implementations of the system disclosed herein, the system may be a web based system. In such implementations, an individual's identity may be verified remotely without the individual having to download a particular mobile application intended to verify the individual's identity. Because the system is configured to iteratively rotate the identification card image, the identification card image may be oriented in the same orientation as the picture image and the facial recognition module may be able to compare the likenesses of the two images without having false failed verifications due to one image not being in the same orientation as the other.

Figure 2:
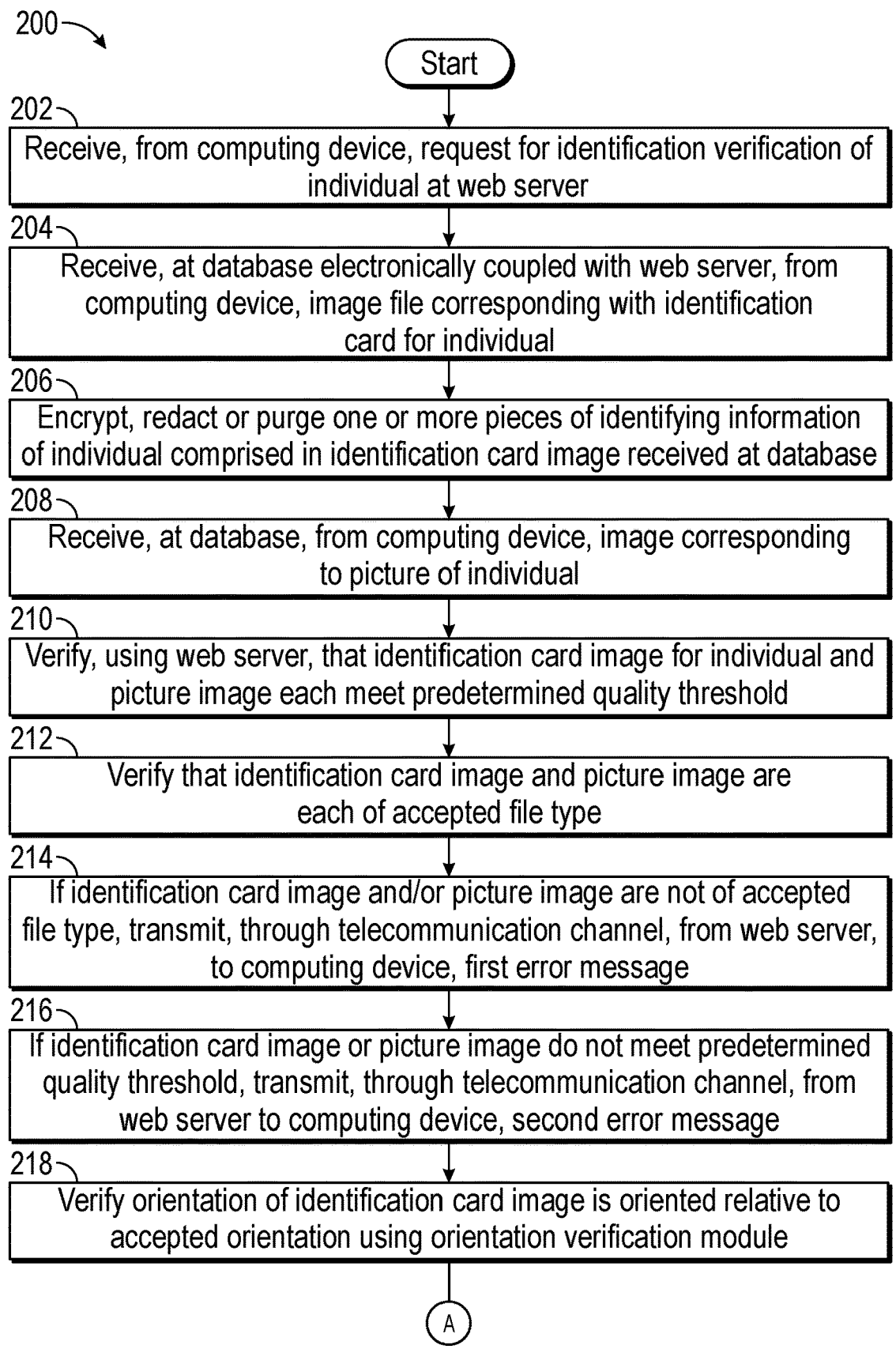
FIG. 2 illustrates a method for identification verification.
Figure 2:
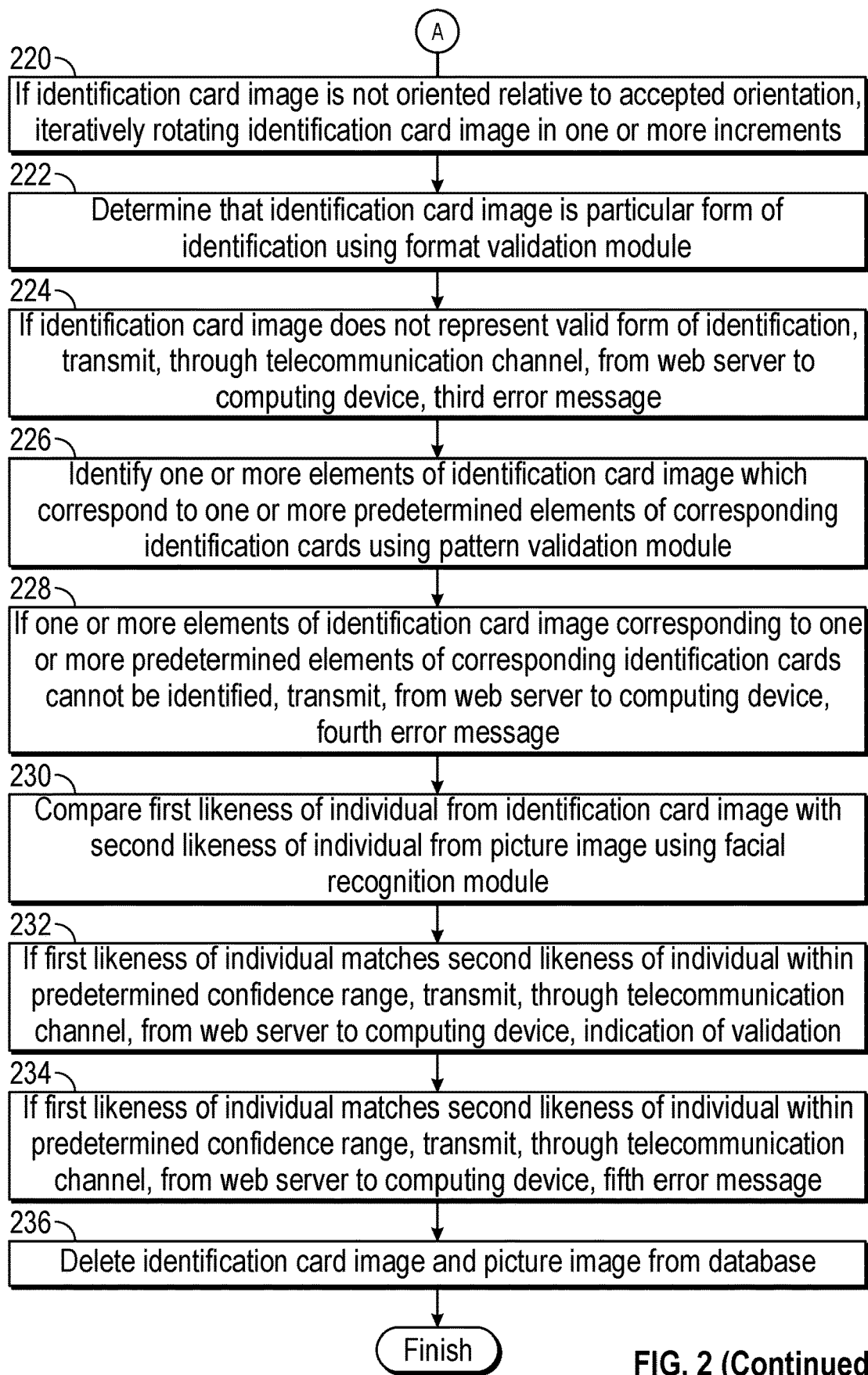

FIGS. 2 and/or 3 illustrate a method 200 for identification verification, in accordance with one or more implementations. Similarly, FIG. 3 also illustrates a method 300 for identification verification. The operations of method 200 and 300 presented below are intended to be illustrative. In some implementations, method 200 and/or 300 may be accomplished with one or more additional operations not described, and/or without one or more of the operations discussed. Additionally, the order in which the operations of method 200 are illustrated in FIGS. 2 and/or 3 and described below is not intended to be limiting. Similarly, The description of the functionality provided by the different modules 108, 110, 112, 114, 116, 118, 120, 122, 124, 126, 128, 130, and/or 136 described below is for illustrative purposes, and is not intended to be limiting, as any of modules 108, 110, 112, 114, 116, 118, 120, 122, 124, 126, 128, 130, and/or 136 may provide more or less functionality than is described. For example, one or more of modules 108, 110, 112, 114, 116, 118, 120, 122, 124, 126, 128, 130, and/or 136 may be eliminated, and some or all of its functionality may be provided by other ones of modules 108, 110, 112, 114, 116, 118, 120, 122, 124, 126, 128, 130, and/or 136. As another example, processor(s) 142 may be configured to execute one or more additional modules that may perform some or all of the functionality attributed below to one of modules 108, 110, 112, 114, 116, 118, 120, 122, 124, 126, 128, 130, and/or 136. Similarly, a web server may be configured to execute one or more additional modules that may perform some or all of the functionality attributed below to one of modules 108, 110, 112, 114, 116, 118, 120, 122, 124, 126, 128, 130, and/or 136.

In some implementations, methods 200 and/or 300 may be implemented in one or more processing devices (e.g., a digital processor, an analog processor, a digital circuit designed to process information, an analog circuit designed to process information, a state machine, and/or other mechanisms for electronically processing information). The processing devices may be any type of processor(s) disclosed herein. The one or more processing devices may include one or more devices executing some or all of the operations of method 200 in response to instructions stored electronically on an electronic storage medium, which electronic storage medium may be the same as or similar to any electronic storage disclosed herein. The one or more processing devices may include one or more devices configured through hardware, firmware, and/or software to be specifically designed for execution of one or more of the operations of method 200 or 300.

While the implementations of the method disclosed herein refer to a computing receiving images and requests from the computing device, consistent with the implementations of the system, it is understood that the computing device may be a remote platform which may be similar to or the same as any remote platform disclosed herein. Similarly, it is understood that the database referred to in implementations of the method may be part of electronic storage which may be the same as or similar to any electronic storage disclosed herein.

Figure 3:
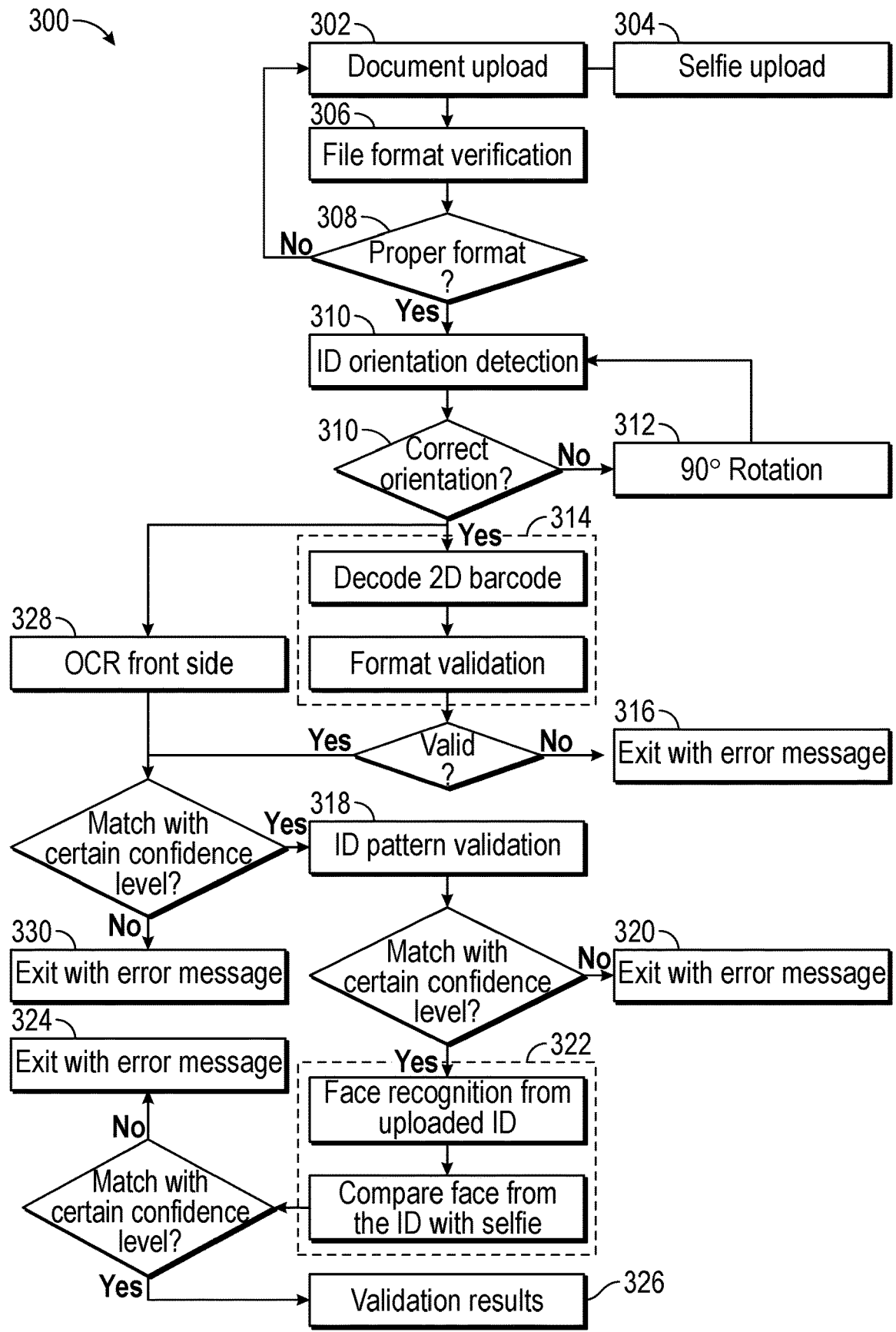
FIG. 3 illustrates a method for identification verification.

FIG. 2 illustrates method 200, in accordance with one or more implementations, and FIG. 3 illustrates method 300, in accordance with one or more implementations.

Referring to FIG. 2, the method 200 may include an operation 202 which may include receiving at the web server from a computing device, a request for identification verification of an individual. The web server may be the same as or similar to any web server disclosed herein. In particular implementations, the web server may include any module disclosed herein. Operation 202 may be performed by one or more processors configured by machine-readable instructions including a module that is the same as or similar to request receiving module 108, in accordance with one or more implementations. The one or more processors disclosed in the method may be the same as or similar to any processor disclosed herein.

An operation 204 may include receiving, at a database electronically coupled with the web server, from the computing device, an image file corresponding with an identification card image. The identification card image may be the same as or similar to any identification card image disclosed herein. Operation 204 may be performed by one or more processors configured by machine-readable instructions including a module that is the same as or similar to image receiving module 110, in accordance with one or more implementations. Operation 302 of FIG. 3 illustrates a particular implementation of the identification card image being transmitted to the database.

An operation 206 may include using the web server, one of encrypting, redacting, or purging one or more pieces of identifying information of the individual included in the identification card image received at the database. Operation 206 may be performed by one or more processors configured by machine-readable instructions including a module that is the same as or similar to privacy module 112, in accordance with one or more implementations. By way of non-limiting example, the one or more pieces of identifying information may include gender information, date of birth information, a drivers license number, a passport number, or any other piece of identifying information aside from the picture of the individual on the identification card image and the name of the individual on the identification card image. In such implementations, the identification verification system may be compliant with the Fair Housing Regulations in place at the time of filing this application.

An operation 208 may include receiving, at the database, from the computing device, an image corresponding to a picture of an individual wherein the database receives the picture image separately from the identification card image. Operation 208 may be performed by one or more hardware processors configured by machine-readable instructions including a module that is the same as or similar to image receiving module 110, in accordance with one or more implementations. Operation 304 of FIG. 3 illustrates a particular implementation of the picture image (which may be a "selfie") being transmitted to the database.

An operation 210 may include in response to receiving the request for identification verification, verifying, using the web server, that the identification card image for the individual and the picture image each meet a predetermined quality threshold. Operation 210 may be performed by one or more hardware processors configured by machine-readable instructions including a module that is the same as or similar to file format module 114, in accordance with one or more implementations.

The method may include an operation 212 which may include in response to receiving the request from the computing device, verifying that the identification card image and the picture image are each of an accepted file type. Operation 212 may be performed by one or more processors configured by machine-readable instructions including a module that is the same as or similar to file format module 114, in accordance with one or more implementations. The accepted file type may be the same as or similar to any file type disclosed herein. Operation 308 of FIG. 3 illustrates a similar operation of determining whether or not the images are of the proper file format.

In various implementations, the method 200 may include an operation 214 which may include, if the identification card image and/or the picture image are not of an accepted file type, transmitting, through a telecommunication channel, from the web server, to the computing device, a first error message. Operation 214 may be performed by one or more processors configured by machine-readable instructions including a module that is the same as or similar to the file format module 114, in accordance with one or more implementations.

The method may include an operation 238 which may include in response to receiving the request from the computing device, verifying that the identification card image and the picture image each meet a predetermined quality threshold. The quality threshold may be any type of quality threshold disclosed herein. Operation 238 may be performed by one or more processors configured by machine-readable instructions including a module that is the same as or similar to quality verification module 130, in accordance with one or more implementations.

An operation 216 may include if one of the identification card image or the picture image do not meet the predetermined quality threshold, transmitting, through the telecommunication channel, from the web server to the computing device, a second error message. Operation 216 may be performed by one or more processors configured by machine-readable instructions including a module that is the same as or similar to the quality verification module 130, in accordance with one or more implementations.

An operation 218 may include verifying an orientation of an identification card image is oriented relative to an accepted orientation using the orientation verification module. The accepted orientation may be the same as or similar to any accepted orientation disclosed herein. Operation 218 may be performed by one or more processors configured by machine-readable instructions including a module that is the same as or similar to orientation verification module 118, in accordance with one or more implementations. The method may include using optical character recognition to determine that the identification card image is oriented relative to the accepted orientation. In other implementations the method may include using facial recognition to determine that the identification card image is oriented relative to the accepted orientation. In still other implementations, the method may include using both optical character recognition and facial recognition technology to determine that the identification care image is oriented relative to the accepted orientation. Operation 310 of FIG. 3 illustrates an operation the same as operation 218.

In various implementations the method may include an operation 220 which may include if the identification card image is not oriented relative to the accepted orientation, using the web server, iteratively rotating the identification card image in one or more increments. The rotation may include any degree of rotation disclosed herein. Upon each iteration, the web server or the orientation verification module may assess if the identification card image is oriented at the accepted orientation. The method may include continually rotating the identification card image and assessing if the orientation of the identification card image is of an accepted orientation until the identification card image is oriented at the accepted orientation. Operation 220 may be performed by one or more processors configured by machine-readable instructions including a module that is the same as or similar to identification card image rotation module 120, in accordance with one or more implementations. Operation 312 of FIG. 3 illustrates an operation the same as operation 220.

In other implementations, the method may include, using a machine learning algorithm and either the web server or orientation verification module and/or identification card image rotation module, determining if the identification card image is rotated in the accepted orientation and if not, determining the number of degrees the identification card image needs to be rotated and rotating the image in a single rotation so the orientation of the identification card image corresponds to the accepted orientation.

In various implementations the method may include an operation 222 which may include determining that the identification card image is a particular form of identification using the format validation module. Operation 222 may be performed by one or more processors configured by machine-readable instructions including a module that is the same as or similar to format validation module 122, in accordance with one or more implementations. In particular implementations, the method may include recognizing a driver's license, a passport, or another document used to verify identification. In particular implementations, the method may include determining that an identification card image represents a valid form of identification by decoding a bar code or other printed code in the identification card image. Operation 314 of FIG. 3 illustrates an operation corresponding to operation 222.

In various implementations the method may include an operation 224 which may include if the identification card image does not represent a valid form of identification, transmitting, through the telecommunication channel, from the web server to the computing device, a third error message. Error message 316 of FIG. 3 illustrates such an error message. Operation 224 may be performed by one or more hardware processors configured by machine-readable instructions including a module that is the same as or format validation module 122, in accordance with one or more implementations.

In various implementations the method may include an operation 226 which may include identifying one or more elements of the identification card image which correspond to one or more predetermined elements of corresponding identification cards using the pattern validation module. The one or more predetermined elements may be the same as or similar to any authenticity elements disclosed herein. Operation 226 may be performed by one or more processors configured by machine-readable instructions including a module that is the same as or similar to pattern validation module 124, in accordance with one or more implementations. Operation 318 of FIG. 3 illustrates an operation that may be the same as operation 226.

In various implementations the method may include an operation 228 which may include if the one or more elements of the identification card image corresponding to the one or more predetermined elements of corresponding identification cards, cannot be identified, transmitting, through the telecommunication channel, from the web server to the computing device, a fourth error message. Error message 320 of FIG. 3 may be an example of the fourth error message. Operation 228 may be performed by one or more processors configured by machine-readable instructions including a module that is the same as or similar to the pattern validation module 124, in accordance with one or more implementations.

An operation 230 may include comparing a first likeness of the individual from the identification card image with a second likeness of the individual from the picture image using the facial recognition module. Operation 230 may be performed by one or more processors configured by machine-readable instructions including a module that is the same as or similar to facial recognition module 126, in accordance with one or more implementations. Operation 322 of FIG. 3 may be similar to or the same as operation 232.

An operation 232 may include if the first likeness of the individual matches the second likeness of the individual within a predetermined confidence range, transmitting, through the telecommunication channel, from the web server or the facial recognition module to the computing device, an indication of validation. Validation results 326 of FIG. 3 is an example of an indication of validation. Operation 232 may be performed by one or more processors configured by machine-readable instructions including a module that is the same as or similar to the facial recognition module 126, in accordance with one or more implementations.

In various implementations the method 200 may include an operation 234 which may include if the first likeness of the individual does not match the second likeness of the individual within the predetermined confidence range, transmitting, through the telecommunication channel, from the web server or the facial recognition module to the computing device, a fifth error message. Error message 324 of FIG. 3 may be an example of a fifth error message. Operation 234 may be performed by one or more hardware processors configured by machine-readable instructions including a module that is the same as or similar to facial recognition module 126, in accordance with one or more implementations. In various implementations, the method may include issuing the fifth error message if the likenesses do not match closely enough or if the likenesses match to closely. In such implementations, the method may be able to accurately determine when the likenesses of the images are not of the same individual while also being able to determine instances where the likenesses are identical, indicating that the individual uploaded two copies of the identification card image rather than uploading a picture image with the identification card image.

In various implementations the method may include an operation 236 which may include deleting the identification card image and the picture image from the database. Operation 236 may be performed by one or more processors configured by machine-readable instructions including a module that is the same as or similar to image deletion module 128, in accordance with one or more implementations.

In various implementations the method 200 may include an operation which may include recognizing text of the identification card image, using optical character recognition, using the web server. This operation is further illustrated by operation 328 of FIG. 3. The operation may be performed by one or more hardware processors configured by machine-readable instructions including a module that is the same as or similar to text recognition module 136, in accordance with one or more implementations. In various implementations, and as illustrated by FIG. 3, if the text identification does not identify the text within a certain confidence level, the method may include transmitting an error message 330 through a telecommunication channel from the web server to the computing device indicating as much.

In various implementations the method may include an operation which may include transmitting, through a third telecommunication channel, a request to a third party, from the web server, to run a criminal background check on the individual.

Figure 4:
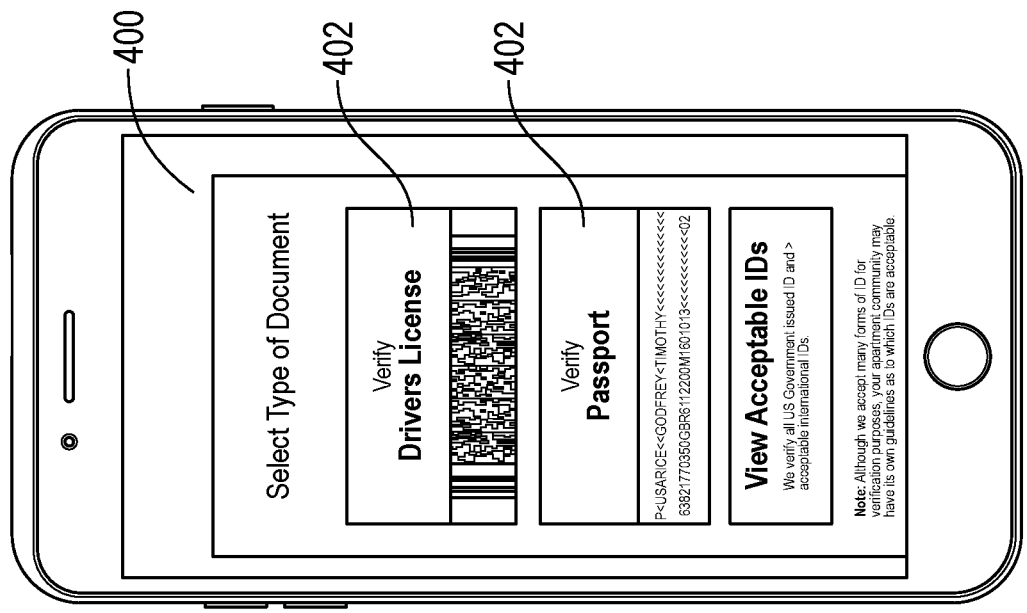
FIG. 4 illustrates a graphical user interface (GUI) prompting the user to select a type of identification.

Referring to FIGS. 4-13, examples of graphical user interfaces (GUI) illustrating what an individual may see when using the identification verification system are illustrated. Any of the GUI's disclosed herein could be a GUI of a mobile phone, tablet, desktop, laptop, or any other computing device. As illustrated by FIG. 4, a GUI 400 prompting the user to select a type of identification is illustrated. As illustrated the user may be presented with two or more options 402 of forms of identification to upload to the computing device (such as a mobile phone) which will be transmitted to web server or image receiving module. In various implementations, the forms of identification may be a driver's license, passport, or other form of government, school, employer, or other identification. In various implementations, the user may be able to click on the form of identification that he/she wishes to upload.

Figure 5:
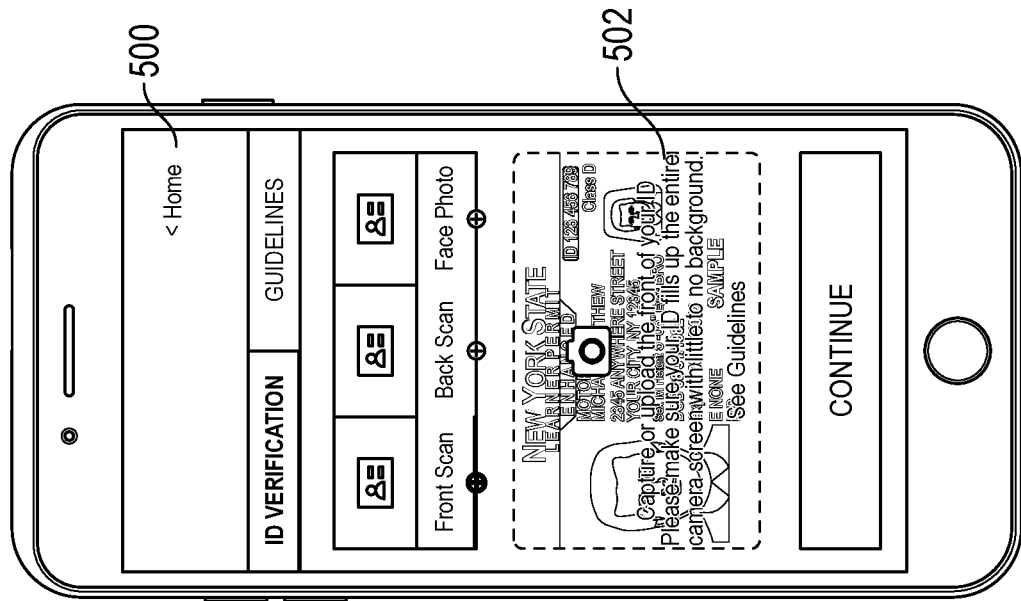
FIG. 5 illustrates a GUI for uploading the front side of the identification card.

Referring to FIG. 5, an example GUI 500 for uploading the front side of the identification card is illustrated. As illustrated, the user may be able to click to capture a picture of the front side of the identification. In various implementations, the picture may be taken with a web camera, the camera of a mobile computing device such as phone or tablet, a camera external to the computing device, or by any other capturing means. As illustrated, the system may instruct the user on acceptable pictures, copies, or orientation. Further, as illustrated by FIG. 5, the GUI 500 may include guidelines 502 on how to capture or upload an acceptable image.

Figure 6:
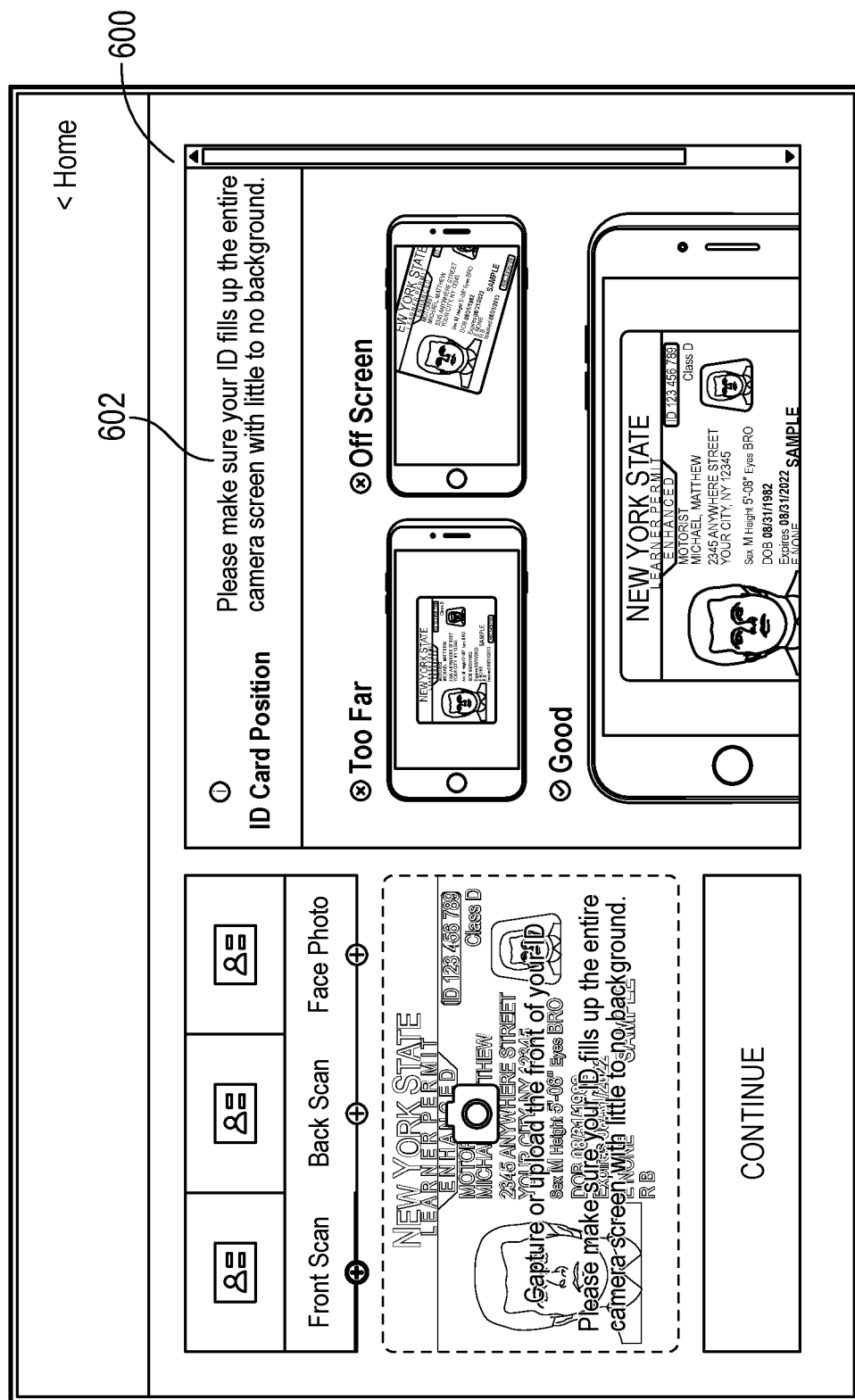
FIG. 6 illustrates a GUI having guidelines for uploading a front side of an identification card.

Referring to FIG. 6, an example GUI 600 of guidelines for uploading a front side of an identification card is illustrated. In various implementations, the GUI may include guidelines 602 indicating what is and is not acceptable when capturing the front of the identification card image.

Figure 7:
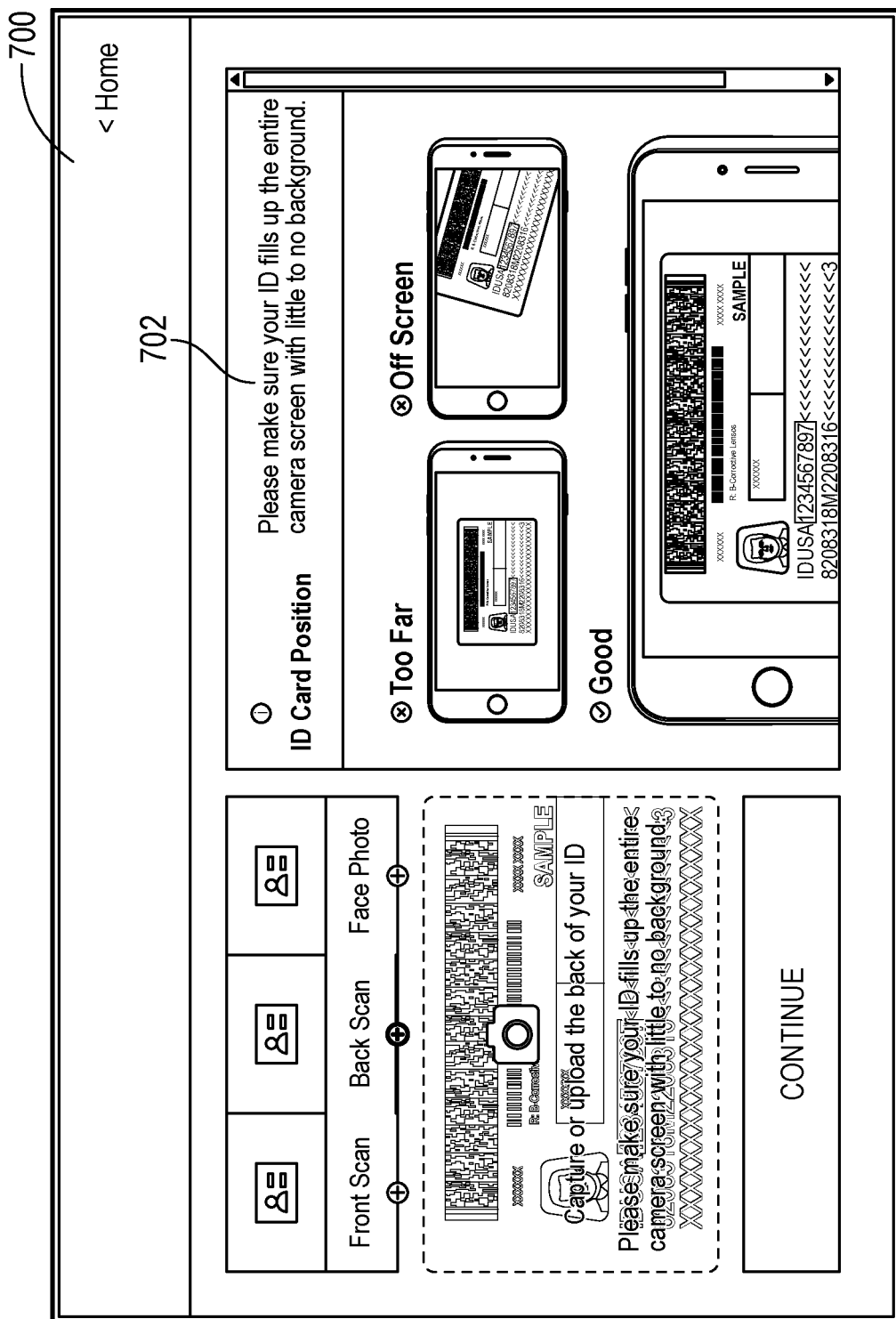
FIG. 7 illustrates a GUI having guidelines for uploading a back side of an identification card.

Referring to FIG. 7, an example GUI 700 of guidelines for uploading a back side of an identification card is illustrated. In various implementations, the GUI may include guidelines 702 indicating what is and is not acceptable when capturing the back of the identification card image.

Figure 8:
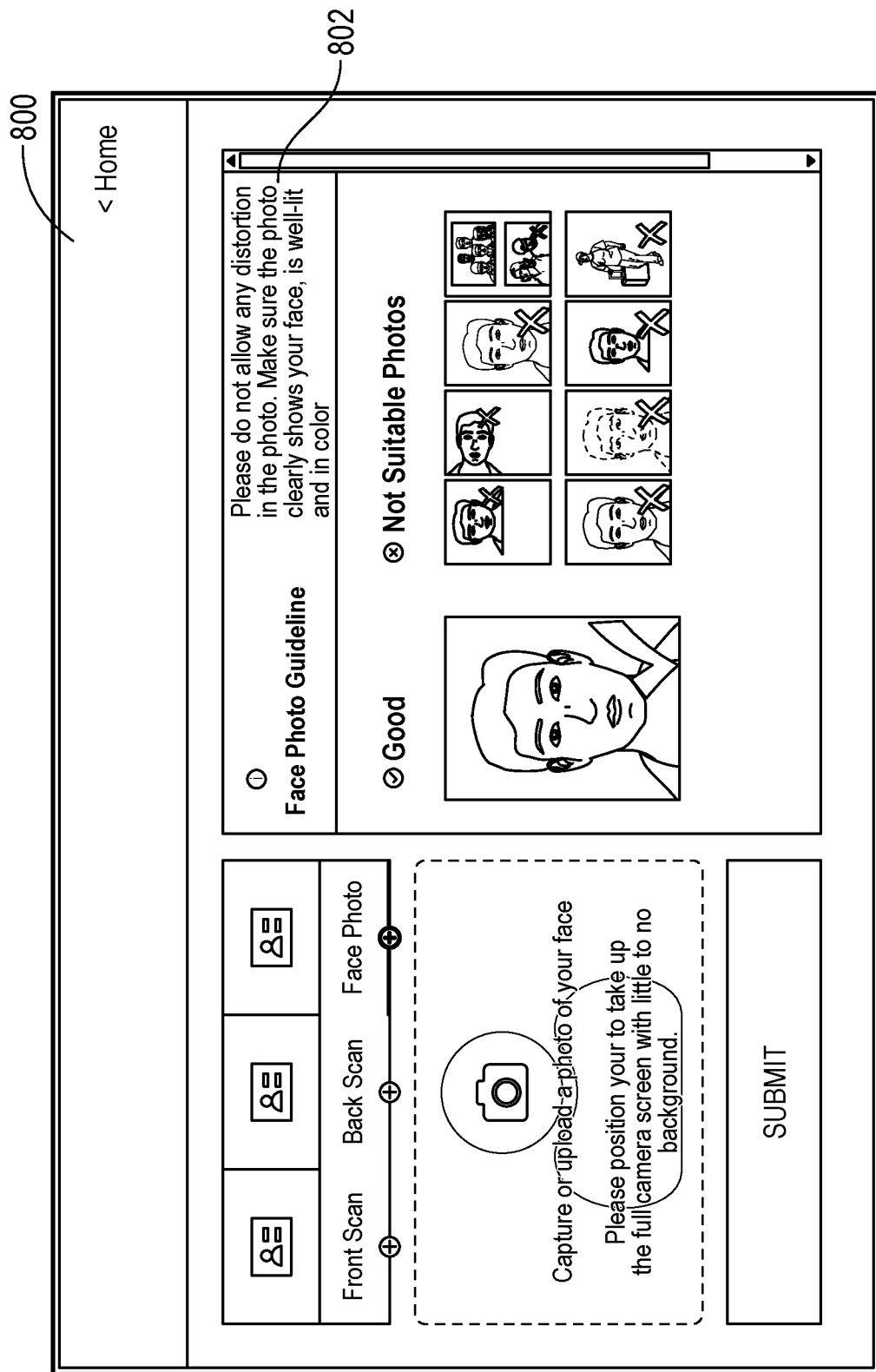
FIG. 8 illustrates a GUI having guidelines for uploading a picture image.

Referring to FIG. 8, an example GUI 800 of guidelines for uploading a picture image are illustrated. In various implementations, the GUI may include guidelines 802 indicating what is and is not acceptable when capturing the back of the identification card image.

In various implementations, the picture of the identification card or of the individual may be taken with a web camera, the camera of a mobile computing device such as a phone or tablet, a camera external to the computing device, or by any other capturing means. As illustrated, the system may instruct the user on acceptable pictures, copies, or orientation.

Figure 10:
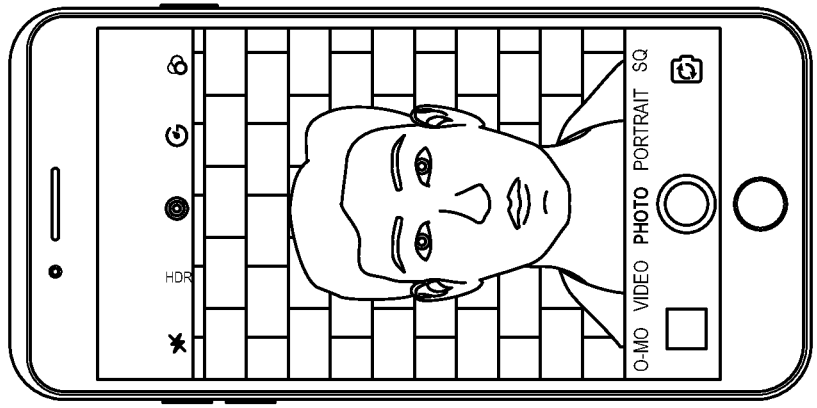
FIG. 10 illustrates a GUI illustrating an acceptable picture image.
Figure 9:
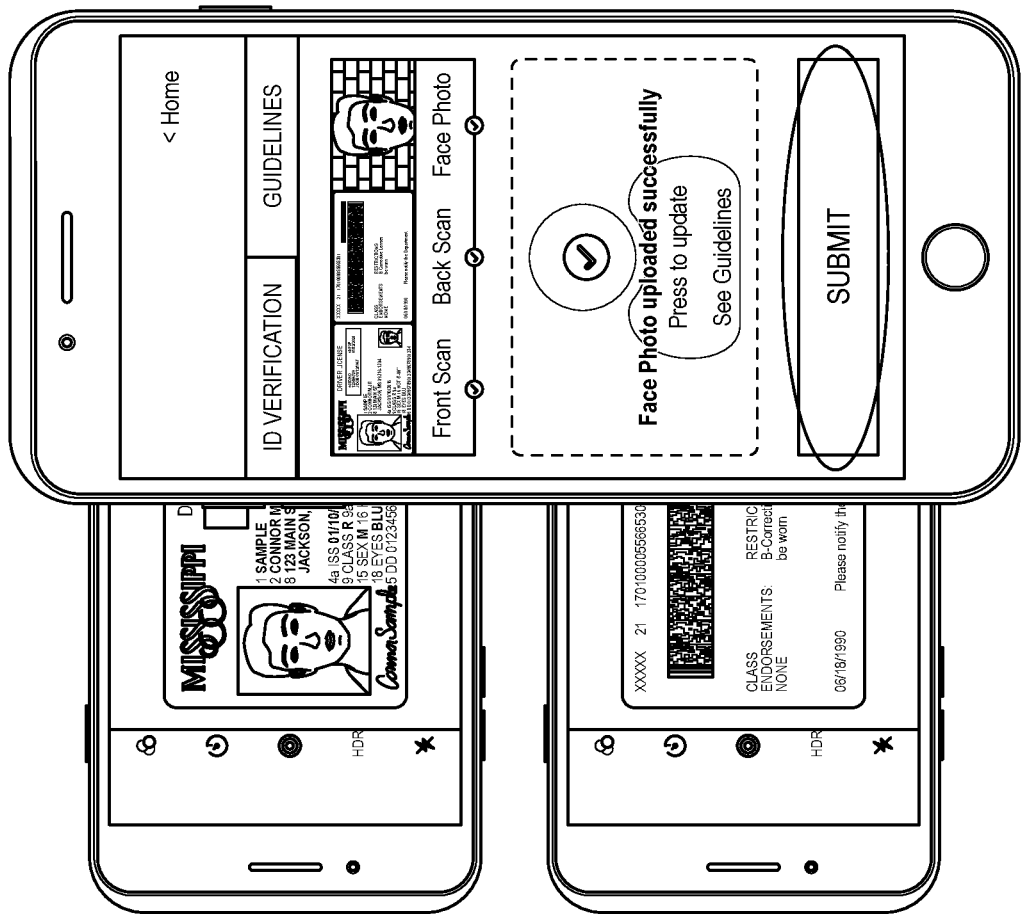
FIG. 9 illustrates a GUI illustrating an acceptable identification card image.
Figure 12:
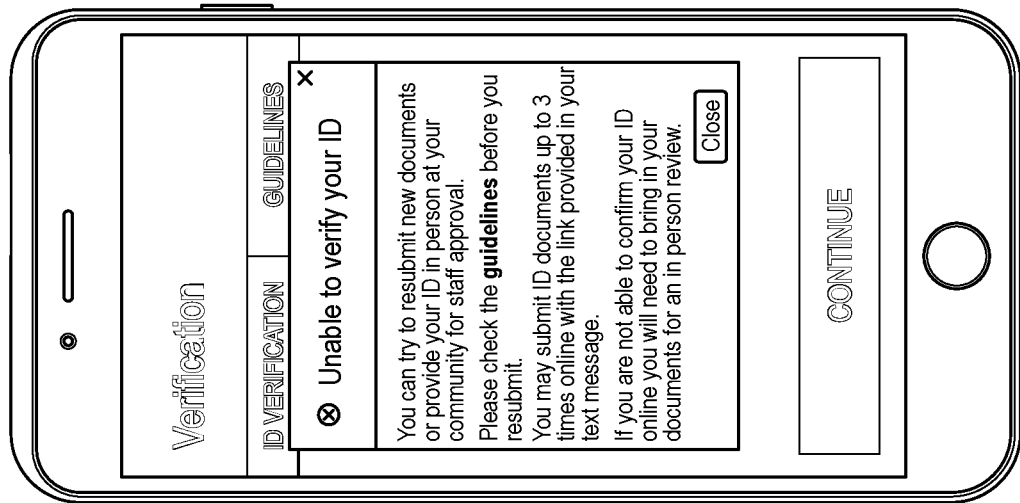
FIG. 12 illustrates a GUI illustrating a message indicating a failed identification verification.
Figure 11:
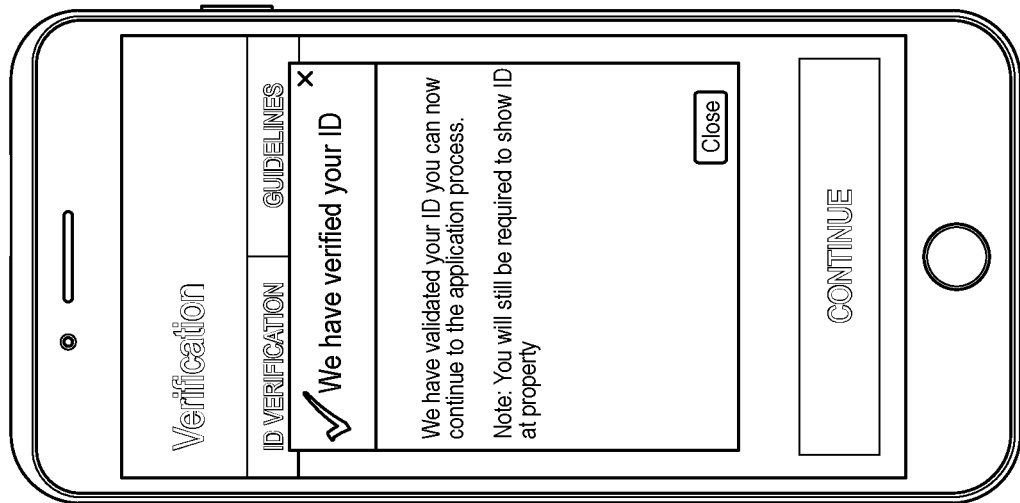
FIG. 11 illustrates a GUI illustrating a message indicating verification of identification.

Referring to FIG. 9, a GUI illustrating an acceptable identification card image is illustrated. Similarly, as illustrated by FIG. 10, a GUI illustrating an acceptable picture image is illustrated. Referring to FIG. 11, a GUI illustrating a message indicating verification of identification is illustrated. Referring to FIG. 12, a GUI illustrating a message indicating a failed identification verification is illustrated. In various implementations, the message indicating the failed identification verification may be accompanied with instructions on how to verify the identity of the individual. In various implementations, the GUI of FIG. 11 or FIG. 12 may only be displayed after method 200 disclosed herein is complete.

Referring to FIG. 13, a GUI of a computing device operated by a manager of the system is illustrated. In various implementations, the manager of the identification verification system may receive a report indicating that the identification verification either passed or failed. The report may further indicate why the identification verification either passed or failed.

In places where the description above refers to particular implementations for identification verification and implementing components, sub-components, methods and sub-methods, it should be readily apparent that a number of modifications may be made without departing from the spirit thereof and that these implementations, implementing components, sub-components, methods and sub-methods may be applied to other techniques for identification verification.

What is claimed is:

1. A system configured for identification verification, the system comprising:
   one or more processors comprising an image receiving module, a privacy module, a format validation module, a pattern validation module, and a facial recognition module;
   wherein the one or more processors are configured by machine-readable instructions to:
      receive a first image with the image receiving module, the first image comprising an identification document with a first likeness of an individual;
      receive a second image with the image receiving module, the second image comprising a second likeness of the individual;
      encrypt or purge one or more pieces of identifying information of the individual in the identification document of the first image using the privacy module;
      determine whether the identification document in the first image corresponds with a known form of identification document using the format validation module;
      identify at least one element in the identification document and determine whether the at least one element corresponds to at least one authenticity element of the known form of identification document above a predetermined confidence level using the pattern validation module;
      determine whether the first likeness corresponds with the second likeness within a predetermined confidence range using the facial recognition module;
      transmit a first error message to the remote platform through a telecommunication channel using the pattern validation module if the at least one element corresponds to the at least one authenticity element below the predetermined confidence level; and
      transmit a second error message to the remote platform through the telecommunication channel with the facial recognition module if the first likeness is not within the predetermined confidence range of the second likeness.

2. The system of claim 1, wherein the one or more processors further comprise an orientation verification module, and
   wherein the one or more processors are configured by machine-readable instructions to verify whether the first likeness is in a same orientation as the second likeness.

3. The system of claim 2, wherein the one or more processors are configured by machine-readable instructions to iteratively rotate the first image such that the first likeness is aligned with the second likeness.

4. The system of claim 1, wherein the one or more processors further comprise a quality verification module and the one or more processors are configured by machine-readable instructions to verify whether the first and second images each meet a predetermined quality threshold and to transmit a third error message to the remote platform through the telecommunication channel with the quality verification module if at least one of the first and second images does not meet the predetermined quality threshold.

5. The system of claim 1, wherein the one or more processors further comprise a file format module, and
   wherein the one or more processors are configured by machine-readable instructions to verify whether the first and second images are each an accepted file type and to transmit a third error message to the remote platform through the telecommunication channel with the file format module if at least one of the first and second images is not the accepted file type.

6. A method for verifying the identity of an individual, the method comprising:
   receiving a first digital image from a remote platform, the first digital image being in a first orientation and comprising a presented identification document with a first likeness of the individual;
   receiving a second digital image from the remote platform, the second digital image being in a second orientation and comprising a second likeness of the individual;
   encrypting or purging one or more pieces of identifying information of the individual in the presented identification document in the first digital image;
   determining whether the presented identification document in the first digital image corresponds with a predetermined acceptable form of identification;
   identifying at least one element in the presented identification document and determining whether the at least one element corresponds to at least one predetermined authenticity element of the predetermined acceptable form of identification above a predetermined confidence level with a processor implementing machine-readable instructions for pattern validation;
   determining whether the first likeness matches the second likeness within a predetermined confidence range with the processor implementing machine-readable instructions for facial recognition;
   transmit a first output to the remote platform, the first output being indicative of whether the presented identification document represents a valid form of identification and whether the at least one element corresponds to at least one predetermined authenticity element of the predetermined acceptable form of identification above a predetermined confidence level; and
   transmit a second output to the remote platform, the second output being indicative of whether the first likeness is within a predetermined confidence range of the second likeness.

7. The method of claim 6, further comprising determining whether the first orientation corresponds to the second orientation using optical character recognition.

8. The method of claim 6, further comprising determining whether the first orientation corresponds to the second orientation using facial recognition.

9. The method of claim 6, further comprising iteratively rotating the first digital image until the first digital image is in the second orientation.

* * * * *